(12) United States Patent
Kent

(10) Patent No.: US 6,843,876 B1
(45) Date of Patent: Jan. 18, 2005

(54) RUBBER TO METAL BONDING METHOD

(76) Inventor: Howard Daniel Kent, 11635 Gerald Ave., Granada Hills, CA (US) 91344

( * ) Notice: Subject to any disclaimer, the term of this patent is extended or adjusted under 35 U.S.C. 154(b) by 0 days.

(21) Appl. No.: 09/598,181

(22) Filed: Jun. 21, 2000

Related U.S. Application Data

(63) Continuation of application No. 09/045,662, filed on Mar. 20, 1998, now Pat. No. 6,080,493.

(51) Int. Cl.[7] .......................... B32B 31/12; B32B 33/00
(52) U.S. Cl. ..................... 156/280; 305/189; 305/192; 305/197
(58) Field of Search ................... 156/287, 280; 305/157, 158, 166, 185, 189, 192, 197, 51

(56) References Cited

U.S. PATENT DOCUMENTS

| | | | |
|---|---|---|---|
| 3,616,841 A | 11/1971 | Walz | 164/34 |
| 3,839,080 A * | 10/1974 | Jarema et al. | 428/312.2 |
| 3,946,039 A | 3/1976 | Walz | 264/332 |
| 3,980,280 A | 9/1976 | Benson | 259/2 |
| 4,099,961 A | 7/1978 | Patten | 75/20 |
| 4,254,621 A | 3/1981 | Nagumo | 60/282 |
| 4,470,641 A * | 9/1984 | Swarthout | 305/189 |
| 4,740,340 A | 4/1988 | Pratt et al. | |
| 4,844,561 A * | 7/1989 | Savage et al. | 305/160 |
| 4,973,358 A | 11/1990 | Jin et al. | 75/415 |

FOREIGN PATENT DOCUMENTS

| | | |
|---|---|---|
| JP | 55-049258 | 4/1980 |
| JP | 02-262406 | 10/1990 |

* cited by examiner

*Primary Examiner*—Melvin C. Mayes
*Assistant Examiner*—Chan Sing Po
(74) *Attorney, Agent, or Firm*—Susan L. Crockett, Esq.; Crockett & Crockett

(57) ABSTRACT

Tank treads, brake linings, rifles stocks, and other devices requiring the bonding of metal to rubber, epoxy, or plastic, with a layer of metal foam interposed between the metal and the rubber or plastic.

8 Claims, 6 Drawing Sheets

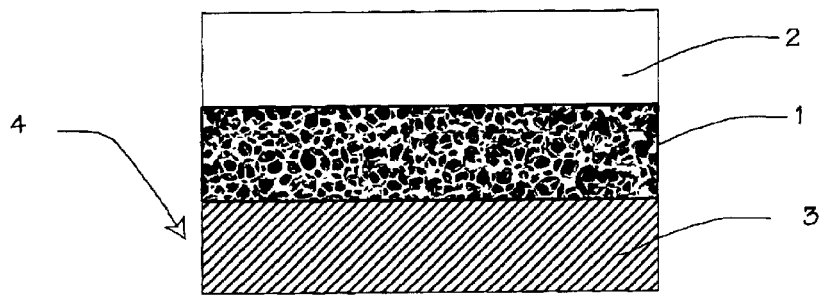
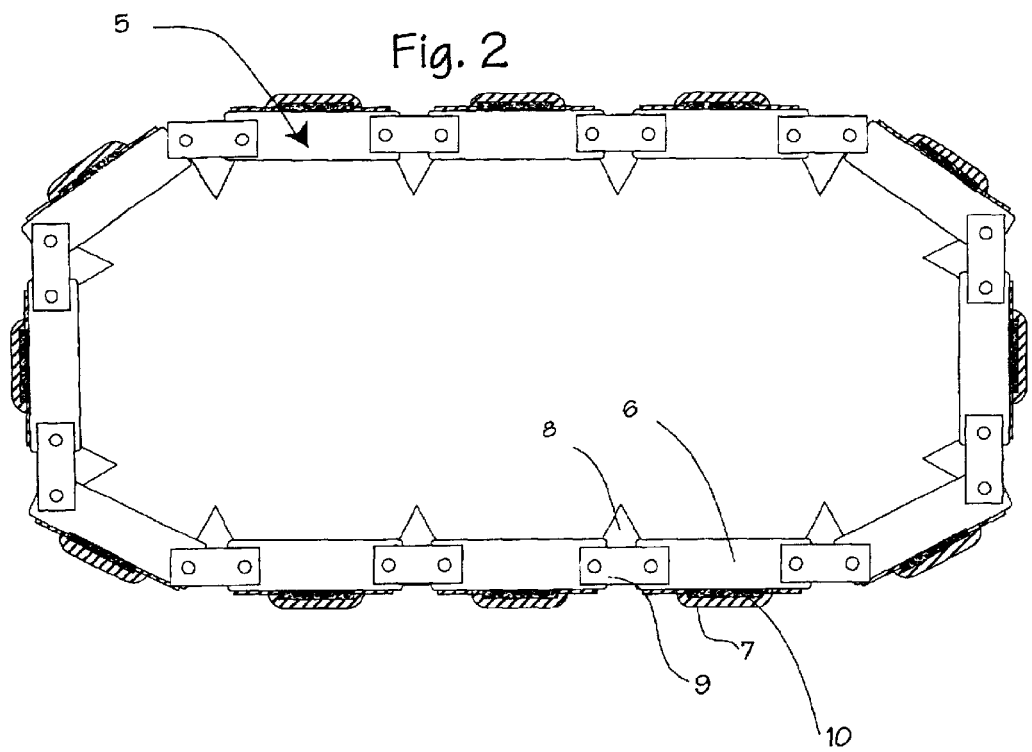

RUBBER TO METAL BONDING METHOD

RELATED PATENT APPLICATION

This application is a continuation application of Ser. No. 09/045,662 filed Mar. 20, 1998, now U.S. Pat. No. 6,080,493 issued Jun. 27, 2000.

FIELD OF THE INVENTION

This invention relates to methods of bonding structural materials, such as metal, to non-adherent materials, such as rubber.

BACKGROUND OF THE INVENTION

Rubber will not directly bond to metal. The metal must first be painted with primer prior to bonding the rubber. The primer provides a small surface area and low strength bond between the metal and the rubber. Thus, the weak link in the bond is merely the "strength" of the primer. This process is used in products as diverse as car bumpers, armored tank tracks and engine mounts.

For example, armored tank tracks are made of metal machined to form the links and track plates which are fitted together to form a continuous belt. Most tank plates have rubber pads which provide better traction and prevent the roads from being chewed up by the tank tracks. In addition, the "road and bogey wheels" which are found inside the tracks are also generally coated with rubber to increase traction, reduce metal to metal wear, limit vibration in the suspension and reduce the noise the tank makes in motion.

The steel track plates are painted with primer before the rubber is bonded with heat and pressure. The rubber pad can be separated from the track plate by shearing, due to normal operations (acceleration and steering) or rough road surface, and by heat deterioration, due to friction and vehicle weight (approximately 130,000 pounds). A complete set of tracks for a U.S. Army M-1 Abrams tank can cost as much as $100,000.00 and may only last from 300 to 2000 miles.

In another example, a car bumper is made of rubber coated steel. The steel backing is painted with primer. The rubber is then bonded to the primed steel with heat and pressure. The rubber coating may stand up to straight on (perpendicular) forces, but will easily be "peeled" or "sheared" off by forces from the side (lateral forces). This peeling may even occur, and thus the car bumper will fail, before either the steel backing or the rubber has worn.

Aside from the paint-like primer method, other methods have been used to increase the surface area and strength of the bond between metal and rubber. They fall into three categories: mechanical or chemical etching, machining or channeling, and perforation. Etching consists of abrasive, shot or bead blasting and selective surface erosion by exposure of the metal to acids or strong chemical solutions. Machining or channeling involves the use of deeper cuts and bends in the metal. Perforation allows the rubber to penetrate and form plugs which resist delamination behind the metal. Each of these methods are expensive, and each method weakens the metal surface and may concentrate delamination forces within the rubber compound, thus defeating their purpose.

In a completely different field, inventors have proposed open-celled foams made of metal or the like for use as lightweight building materials, solid propellant reinforcement and burning rate modifiers, battery plates, fluid phase separators, heat shields, heat exchanger cores, radiation shields, fluid filters, shock absorbers, as well as in numerous other applications.

Walz, *Reticulated Foam Structure*, U.S. Pat. No. 3,946,039, Mar. 23, 1976, describes the process by which a reticulated foam structure is made of metals, ceramics, polymers, etc. In Walz' method, an original polyurethane foam, or sponge, is manufactured to the desired specification of the metal foam which is desired. Then a fluid suspension of a metallic salt is introduced into the original polyurethane foam structure and allowed to set to a rigid structure. This step is called the investment. In this way, a "positive" is formed of the original polyurethane foam structure. The next step is the removal of the original polyurethane foam structure, so as to provide a pattern of voids or internal passageways in the investment which correspond to the original foam structure. In the next step, molten metal is poured into the positive which fills the voids of the positive, forming the final reticulated foam structure which is nearly identical to the original polyurethane foam. Finally, the investment is dissolved in a convenient medium, leaving a metal foam with all the pores empty.

Under this process, reticulated foams may be prepared of various metals, such as aluminum, steel, beryllium, magnesium, uranium, iron, etc.; alloys, such as aluminum-silicon, aluminum-magnesium, and aluminum-zinc; ceramics based on aluminum oxide, silicon dioxide, ferric oxide, including refractories, such as carbides and nitrides; and organic polymers, such as polymides, polyaromatic ethers and thioethers, fluorocarbons. The pore sizes of the inorganic composition vary from 3 to 125 pores per linear inch (ppi). Commercially, pore sizes may be obtained in at least a range of 10 ppi to 100 ppi.

Walz, *Method of Making an Inorganic Reticulated Foam Structure*, U.S. Pat. No. 3,616,841, Nov. 2, 1971, is substantially similar. Others have improved on the process, suggesting use of various materials for the original foam, such as natural reticulated materials like sponges and coral.

SUMMARY OF THE INVENTION

The invention described herein provides a method which increases the surface area of a metal to rubber bond, dramatically improving the strength of the bond. Here, a metal foam is attached to the metal structural element before the molten rubber is cast. The rubber absorbs into and becomes entangled in the metal foam, forming a superior bond and making it virtually impossible for the rubber to peel off. The result is a bond which may have hundreds of times the surface area as compared with the prior art primer method. This improved bonding method can be used for any bond between a structural material, such as metal, and a non-adherent material, such as an elastomer, epoxy or plastic. The metal foam may replace the prior art use of paint primer, or it may be used in combination with a primer.

The uses for this new bonding method are vast. Armored tank tracks made with this method will save the military millions of dollars each year in repair costs since the rubber pads on the track plates will last much longer. Car bumpers made with this method will be more durable. Brake pads formed by this method will essentially polish brake drums rather than gouge them when over-worn. This bonding method may also be applied to engine mounts, rifle stocks, seals, O-rings, and space applications, such as the heat absorbing ceramic tiles on the space shuttle.

By way of illustration, an armored tank track can be made by taking the existing track plate made of steel, welding the metal foam to the track plate, placing the track plate and metal foam combination in the same track plate mold used today, pouring liquefied rubber into the track plate mold and casting under high pressure. The significant difference between the prior art and the improved method described herein is the intermediate stage of attaching the metal foam to the track plate prior to priming the track plate before molding.

BRIEF DESCRIPTION OF THE DRAWINGS

FIG. 1 illustrates the bonding process described herein.

FIG. 2 illustrates an overview of an armored vehicle track assembly and a breakdown of its components.

DETAILED DESCRIPTION OF THE INVENTION

Figure 3:
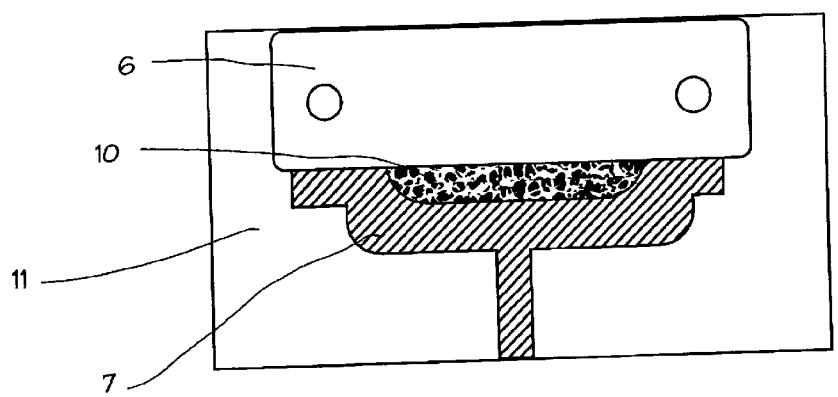
FIG. 3 is illustrates the improved method of forming the rubber pad of an armored vehicle track plate.

FIG. 1 illustrates the bonding method described herein. A structural element 2 is secured to a non-adherent material 3 via the intermediary foam 1. Generally, the embodiments and applications of the inventions will have an intermediary foam 1 made of metal such as aluminum or steel, a structural element 2 made of aluminum or steel, and a non-adherent material 3 made of rubber or plastic. Here, the structural material 2 is attached to the foam 1. The part of the foam and structural material that will be in contact with the non-adherent material are coated with a primer to enhance adhesion such that the non-adherent material will not peel off of the structural material not covered by the foam. The non-adherent material 3 in a liquefied form is then poured over the foam and structural material which has been set in a mold or tooling. The combination of the structural element, foam and non-adherent material makes up the final composite 4.

The structural material 2 chosen depends upon the user's application. Such materials include any type of metal, ceramic or other material to which, for example, rubber or plastic is difficult to bond. In a typical application, such as an automobile bumper or armored vehicle track, the structural material could be steel, chosen for its strength and durability. In another application, aluminum could be chosen for its pliability and light weight.

The foam 1 used will typically be a reticulated open-celled foam made according to the methods such as those described in Walz, *Reticulated Foam Structure*, U.S. Pat. No. 3,946,039, Mar. 23, 1976 and Walz, *Method of Making an Inorganic Reticulated Foam Structure*, U.S. Pat. No. 3,616,841, Nov. 2, 1971. This foam has a reticulated structure, meaning that it is constructed so as to form a network of open pores. Other open celled foams may be used, and closed cell foams and non-reticulated foams may also be used.

Open-celled foams can be made of metals, alloys, ceramics, polymers, etc., and the type selected will depend on the user's application. Pore sizes may be obtained in at least a range of 10 ppi to 100 ppi. The more dense the reticulated foam, the greater the surface area of the bond.

Closed-cell reticulated foams could also be adapted for use in this improved bonding method. Patten, *Closed Cell Metal Foam Method*, U.S. Pat. No. 4,099,961, Jun. 11, 1978, describes a method of making a closed-cell reticulated foam wherein inert gas is trapped within the metal or metal alloy to achieve a porous airy interior, yet leaving the surface smooth. Closed-cell foams could be adapted for use by, for example, cutting the foam open and exposing the airy interior. The smooth surface could be attached to the structural material, leaving the airy interior exposed to bond with the rubber.

Other "foamed" metals, which could be substituted for the open-celled foam, have been produced in varying degrees of porosity by a number of well documented means. These means include "sintered" metal, plating or buildup over a foam-like substrate, and rapid cooling off and air injection into liquid metals. Sintered metal is created by mixing plastic beads with powdered metal, adding a binder, and the mixture is then compressed and bonded together. The metallic powder is sintered by heating the mixture, with the plastic beads oxidizing, and eventually escaping as gas and water vapor.

The foam 1 can be welded to or fastened to (with, for example, nuts and bolts) the structural material 2 prior to coating or molding. The structural material 2 can also be cast integrally with the foam during the preparation of the foam by placing the structural material at the bottom or other portion of the foam's mold, causing the structural material to bond to the foam during the foam's cooling, as described in Walz, *Reticulated Foam Structure*, U.S. Pat. No. 3,946,039 (Mar. 23, 1976).

The non-adherent material 3 is chosen depending upon the user's application. Such non-adherent materials include elastomers (rubber, synthetic rubber, urethane), non-elastomers (PVC, polyethylene, etc.), polymers (plastics, nylon, zytel), adhesives (epoxies, resins) or other liquid, plastic or slurried materials (brake lining material, ceramics, and other slurries), provided that the non-adherent material in liquid form is capable of becoming a solid in final manufacture, and is capable of penetrating the foam.

Once the structural material 2 and foam 1 are fastened together, the combined element is then placed in a mold or tooling, ready for molding. The non-adherent material is applied to the structural material with ordinary molding processes, which generally require pouring the non-adherent material into a mold, setting the structural element into the non-adherent material, and causing the non-adherent material to solidify on the structural material. Solidification of the non-adherent material may be accomplished by heating, cooling, light exposure, pressure, chemical reaction, dehydration, microwave radiation or other means. The non-adherent material travels through the network, becoming entangled within and intermingled with the foam, essentially forming part of the foam layer. This entanglement makes it nearly impossible for the non-adherent material to be separated from the foam once the non-adherent material has solidified. (While pouring is the most convenient way to accomplish the molding step, the molding step may also be accomplished by applying pressure and heat, singly or in combination, to cause the non-adherent material to intermingle with the foam. For example, the non-adherent material may be provided as a powdered polymer or metal, settled into the foam and melted in place, after which it will harden to form a layer that is partially or wholly intermingled intermingled with the foam.)

The improved bonding method described herein has vast applications for any elastomeric or plastic molded products. FIG. 2 illustrates the application of this bonding method to the track components of the typical armored tank treads. The armored vehicle track assembly 5 includes track plates 6, rubber pads 7, edge links 8, center links 9 and a connecting rod (not shown). In the prior art, the rubber pad 7 is attached to the track plate 6 using the painted primer method, whereby the metal track plate 6 is painted with primer and the rubber pad 7 bonded to the track plate 6 with heat and pressure. As shown in FIG. 2, each of the track plates is attached to the rubber pads via the intermediate layer of metal foam 10.

FIG. 3 illustrates the improved method of attaching rubber to the track plate. First, a metal foam 10 is attached to the track plate 6 by welding the two together, by forming them together, or with fasteners. The metal foam 10 and track plate 6 are then placed into the track plate mold 11, (which may be the same mold used in the prior art such that no new tooling may be required for this molding process). The metal foam 10 and track plate 6 are coated with a primer to enhance adhesion to the lattice of the metal foam and prevent the rubber from peeling off the exposed track plate in the areas where the rubber is in direct contact with the track plate. Rubber is poured into the track plate mold and cast into the desired shape of the rubber pad, then cured to become hard rubber. The areas of black within the foam are rubber, and constitute and integral part of the rubber pad 7 which is intermingled with the lattice of the metal foam, and adheres to the metal foam over a surface area that is many times that of the flat area of the underlying track plate. This results in a much stronger bond that lasts longer and is much less susceptible to separation under compressive, tensile and shear forces. A significant difference between the process used today and the improved method described herein is the attachment of the metal foam 10 to the track plate 6 prior to molding, instead of merely painting the track plate with primer prior to molding.

Figure 4:
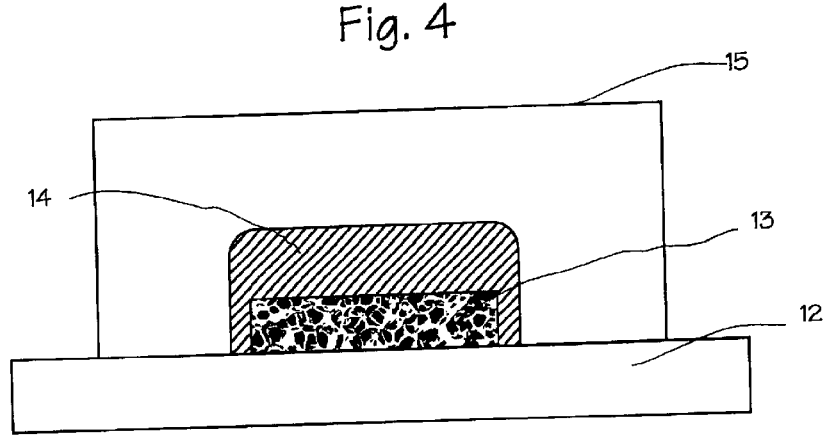
FIG. 4 illustrates an improved method of forming automobile bumpers.

The construction illustrated above can be applied in many areas where rubber or plastic must be secured to metal. FIG. 4 illustrates the improved method of forming automobile bumpers. Here a steel structural material 12 is attached to a metal foam 13, and the automobile bumper made of rubber 14 is attached to the metal foam. The casting is executed when the molten rubber 14 is poured into the mold 15 over the steel structural material 12 and metal foam 13. The rubber 14 penetrates the metal foam 13, creating a strong bond when cured.

Figure 5:
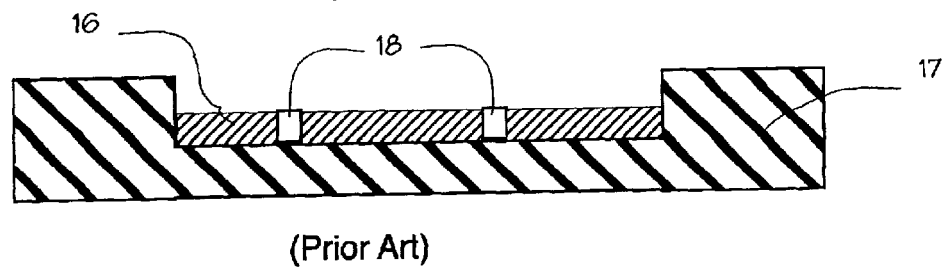
FIG. 5 illustrates the current method of forming brake pads.
Figure 6:
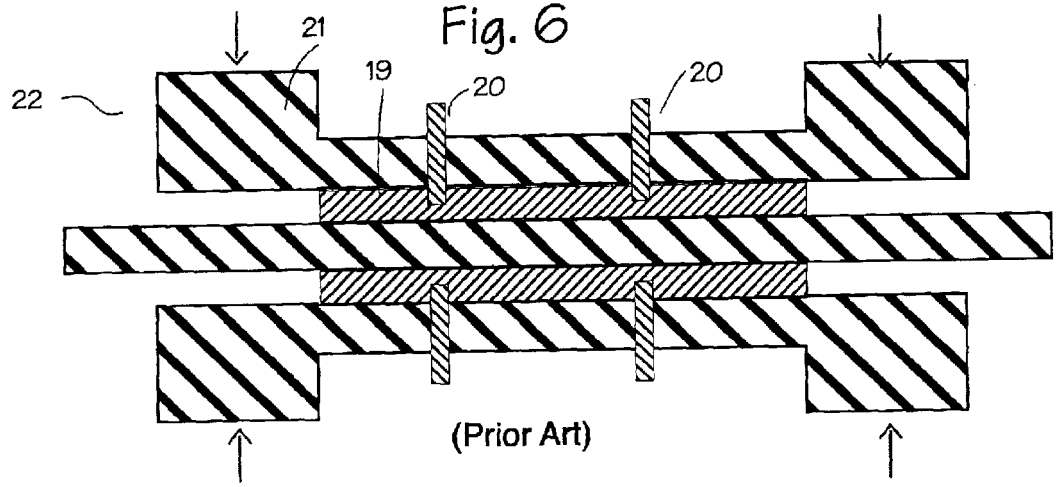
FIG. 6 illustrates a prior art braking assembly.

The new bonding method described herein can also be used in making brake pads. FIG. 5 illustrates the prior art, whereby brake lining material 16 (fiber reinforced nonflammable friction materials) in liquid or semi-solid form is poured into a mold 17 with locator pins 18 for rivets which will eventually be installed. The mold is dried until the brake lining material solidifies. The resulting dried pad 19, shown in FIG. 6, is riveted with rivets 20 to the brake backing 21 forming the final brake pad assembly 22. One disadvantage of this method is that the rivets wear into and eventually destroy the brake rotor or brake drum if the pads are worn beyond the depth of the rivets (a common occurrence), requiring that the rotor or drums be turned to recreate a smooth surface. Also, the rivets tend to break when they contact the drum or rotor, making the brake pad fall off its backing, resulting in uncontrolled braking and extensive damage to the brake system. To avoid the necessity of turning the rotors and the damage from a thrown brake shoe, brakes should be replaced when the pad is still thicker than the rivets. When drivers actually follow this advice, it leads to waste of the friction material.

Figure 7:
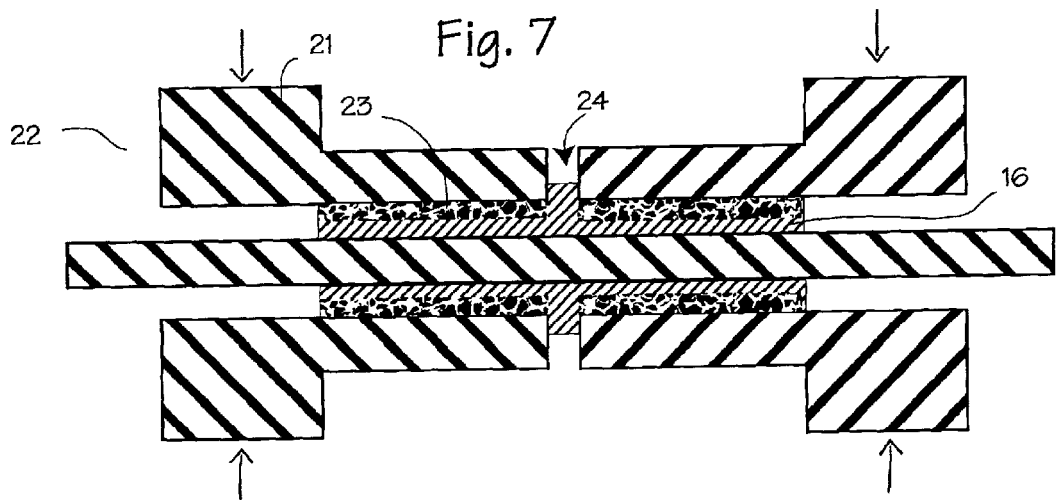
FIG. 7 illustrates an improved braking assembly.

To solve the problems with riveted brakes, the rivets can be replaced with metal foam. FIG. 7 illustrates the improved brake pad, whereby metal foam 23 is welded to the brake backing 21. A hole 24 is then drilled through the brake backing 21 and metal foam 23 through which to pour the brake lining material 16. The mold is dried until the brake lining material solidifies, forming the completed brake pad assembly, here with integrated brake pad backing and no rivets. This construction provides a much stronger bond between the brake backing and the friction material due to the greater area of bonding. It also reinforces the brake pad structure to prevent fragmenting, and allows use of softer materials which would cause little or no damage to the rotor or drum and provide longer life through greater thermal transfer. Also, when the friction material wears to the metal foam, the rotor is still exposed to substantial amounts of brake material to provide braking, and the uniformly distributed metal foam will essentially polish the rotor. This polishing may over time cause wear to the rotor, but will not cut deep grooves in the rotor as done by the rivets currently in use.

Another use for this improved bonding method is for rifle stocks. Rifle stocks are constructed of plastics, epoxies, fiberglass, wood or reinforced composites. The gun barrel and action bedding block (which houses the rifle action) are molded directly into the gun stock or set into the stock with epoxy. Gun accessories such as bipods and other parts are typically fastened to the stock with bolts and bolt receivers molded into the stock or set into the stock with epoxy. Rifle stocks experience a variety of stresses, from the actual firing of powerful cartridges to rough handling in transit or use. Fasteners or bolts used to hold the gun together frequently pull out of the plastic, epoxy, fiberglass, wood or reinforced composite rifle stocks because of their small bearing surface area. The homogeneous type of bedding block which is subject to extreme forces, tends to loosen within the stock after extended use.

Figure 8:
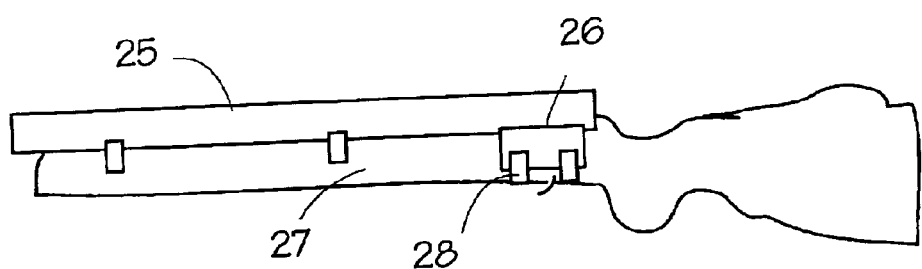
FIG. 8 illustrates the current method of forming rifle stocks.
Figure 9:
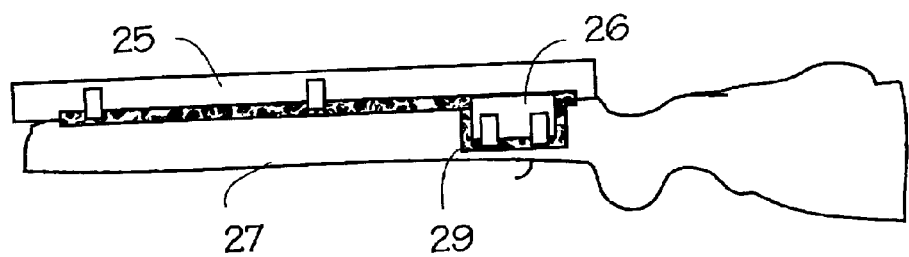
FIG. 9 illustrates the improved method of forming rifle stocks.

An improved method of attaching gun parts together would be to provide in the rifle stock a "bed" for a metal foam wherein the action would be embedded. FIG. 8 shows an example of a prior art gun formation where a metal gun barrel 25 and bedding block 26 is attached to the rifle stock composite material 27 with one or more bolts 28. FIG. 9 shows the improved method wherein a welded foam 29 composite made of steel (or the same metal used for the bedding block) is molded into the rifle stock 27. When the rifle stock is molded under the typical molding techniques, the foamed bedding block 29 is set into the mold. Alternatively, metal foam mounting elements are set into the rifle stock during molding, and the rifle barrel and action are bolted into the metal bedding block welded to foam and set into mold prior to molding. In either case, the percussive force of firing is borne by the metal foam, and dispersed over a wide area of the rifle stock, thereby avoiding damage to the stock.

Figure 10:
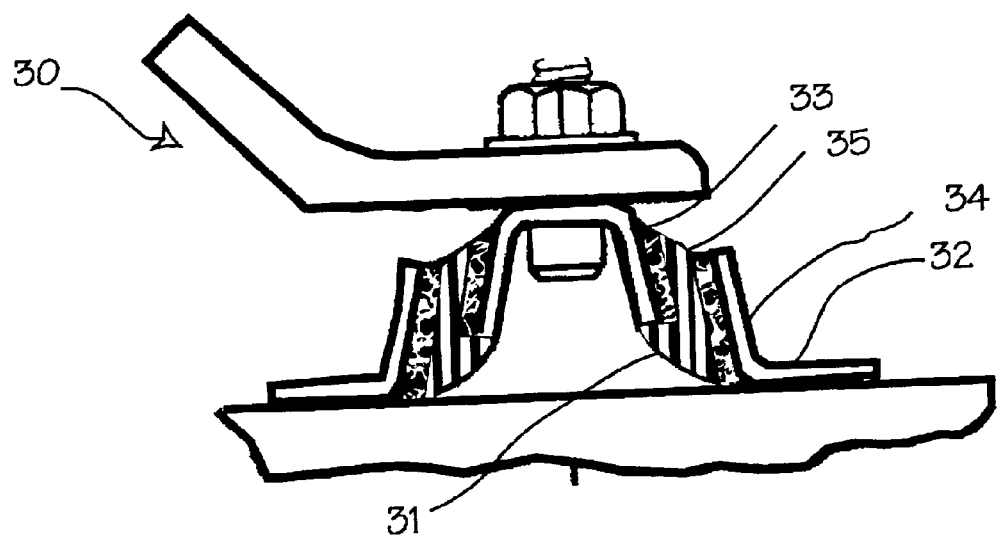
FIG. 10 illustrates the improved method of forming engine mounts.

The new bonding method described herein can also be used in making engine mounts. Engine mounts are used to attach, for example, an engine to a car frame, and typically have a high failure rate. FIG. 10 illustrates the improved method for making an engine mount 30. Engine mounts typically fail when the rubber ring 31 separates from the metal ring 32 which attaches to the vehicle frame or the metal ring 33 which attaches to the engine block. Separation occurs due the weakness of the rubber to metal bond. To alleviate this problem, metal foam rings 34, 35 have been interposed between the metal rings 32, 33, and the rubber ring 31.

Figure 11:
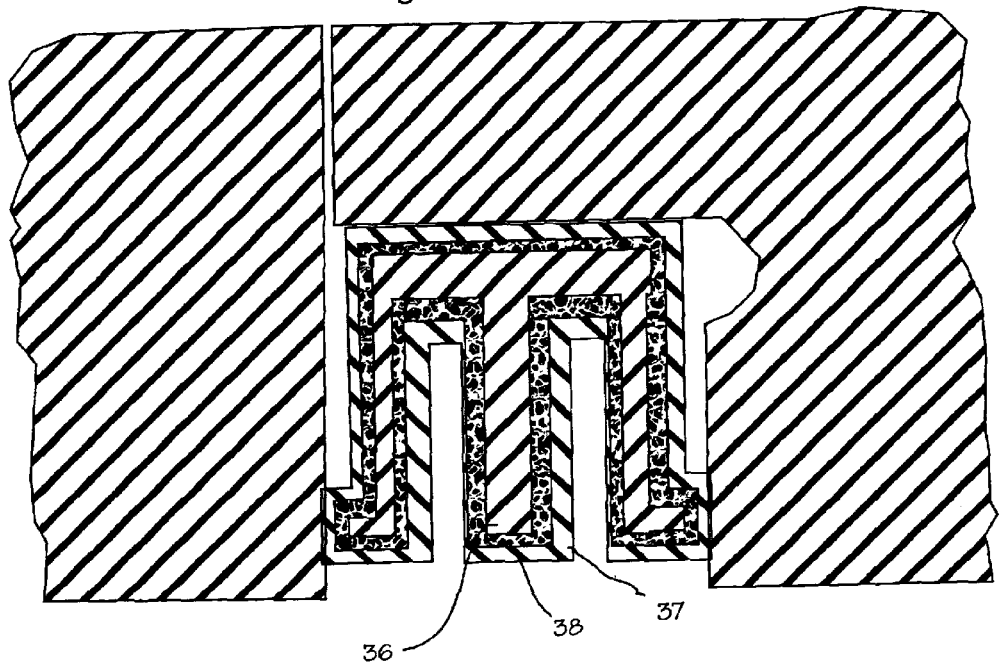
FIG. 11 illustrates the improved method of Teflon coating an O-ring.

Industrial seals, also known as O-rings, are used in thousands of applications, including pipe joints and valve covers to provide air-tight and water-tight seals. The improved bonding method described herein provides a superior bond where the seals are coated, for instance with Teflon. FIG. 11 illustrates just one embodiment of thousands of different metal seals. Here, the metal seal 36 is coated with Teflon 37. As before, a metal foam 38 is interposed between the metal seal 36 and its Teflon coating 37.

Figure 12:
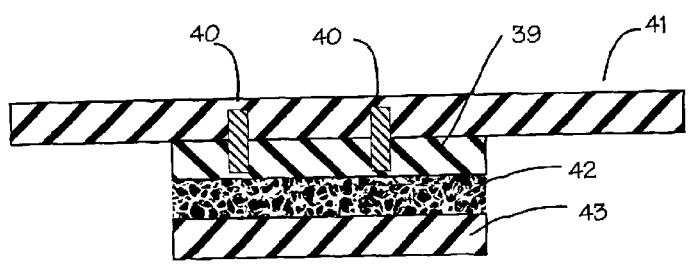
FIG. 12 illustrates a heat shield tile.

Higher temperature foams and ceramics could be combined for space applications. Currently, the exterior of the Space Shuttle is "tiled" with ceramic tiles, which act as insulation against the extremely high temperatures to which the Shuttle is exposed when the Shuttle enters and leaves the earth's atmosphere. These tiles frequently fall off when exposed to high temperatures because currently, the tiles are glued on and the glue fails. FIG. 12 illustrates an improved bonding method whereby a structural material 39 made of a high temperature metal or other high temperature substance, having an embedded attaching means 40 to later be used to attach the final composite to the Shuttle or other spacecraft wall 41, is attached to a high temperature foam 42. A liquid ceramic 43 is then poured over the foam 42 and structural material 39.

In general, the invention is an improved method for bonding a first material and a second material together, said method comprising securing a foam material to the first material, applying the second material to the foam material and causing the second material to intermingle with the foam and then solidify.

Thus, a novel structural material to non-adherent material bonding method has been presented. While specific embodiments and application of this invention have been shown and described, it would be apparent to those skilled in the art that many more modifications are possible without departing from the inventive concepts herein. The invention, therefore, is not to be restricted except in the spirit of the appended claims.

I claim:

1. A method for bonding a first material and a second material together, said method comprising the steps of:
    securing a foam material to the first material; and then
    applying the second material to the foam material;
    wherein the first material is metal, the foam is metal foam, and the second material is rubber.

2. A method for bonding a structural material to a non-adherent material, said method comprising the steps of:
    attaching the structural material and a foam together; and then
    pouring the non-adherent material, in liquefied form, over the foam and structural material, wherein the non-adherent material goes through a process of solidification;
    wherein the structural material is metal, the foam is metal foam, and the non-adherent material is rubber.

3. A method for bonding a first material and a second material together, said method comprising the steps of:
    providing foam;
    attaching the first material to the foam;
    providing the second material in liquefied form; and then
    adding the second material to the foam;
    wherein the first material is metal, the foam is metal and the second material is rubber.

4. A method of attaching rubber to an armored vehicle track plate, said method comprising the steps of;
    attaching a foam to the track plate;
    placing the foam and the track plate into a track plate mold;
    pouring liquefied rubber into the track plate mold; and
    allowing the rubber to solidify whereby at least a portion of the rubber intermingles with the foam thus securing the rubber to the foam.

5. A method of attaching rubber to armored vehicle track plate, said method comprising the steps of:
    securing a foam material to a track plate; and
    applying rubber to the foam material, thereby causing the rubber to intermingle with the foam.

6. A method of bonding a rubber pad to an armored vehicle track plate, said method comprising the steps of:
    providing a foam and interposing said foam between the track plate and the rubber pad;
    attaching the track plate to the foam; and
    providing the rubber in liquefied form and pouring the rubber over the foam and the track plate, and causing the rubber to solidify.

7. The method of bonding rubber to armored vehicle track plates, the method comprising the steps of:
    attaching a foam to a track plate;
    placing the foam and track plate into a track plate mold;
    pouring a rubber into the track plate mold; and
    allowing the rubber to solidify.

8. A method of attaching rubber to a metal piece, said method comprising the steps of:
    attaching metal foam to the metal piece;
    placing the metal foam and the metal piece into a mold; and then
    pouring liquefied rubber into the mold; and
    allowing the rubber to solidify whereby at least a portion of the rubber intermingles with the metal foam thus securing the rubber to the metal foam.

* * * * *